Feb. 7, 1961

M. BONOTTO 2,970,914

COFFEE BEAN PRODUCTS AND METHODS FOR
PRODUCING SUCH PRODUCTS

Filed Sept. 24, 1957

INVENTOR.
MICHELE BONOTTO
BY
Joseph F. O'Brien
ATTORNEY

Feb. 7, 1961
M. BONOTTO
2,970,914
COFFEE BEAN PRODUCTS AND METHODS FOR PRODUCING SUCH PRODUCTS
Filed Sept. 24, 1957
3 Sheets-Sheet 3
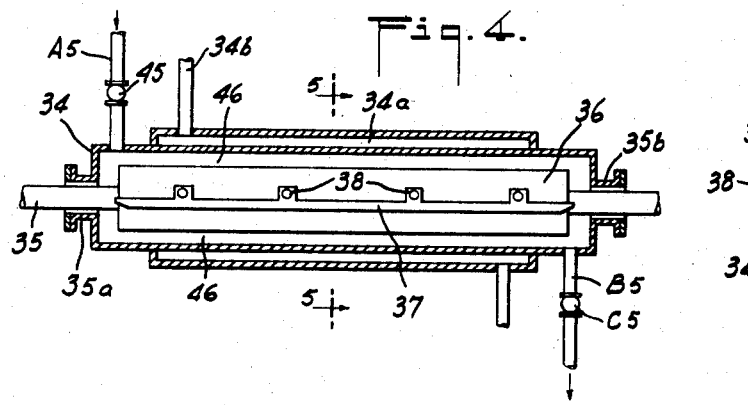
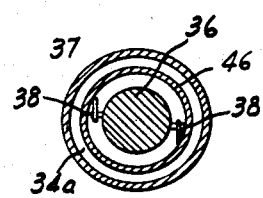
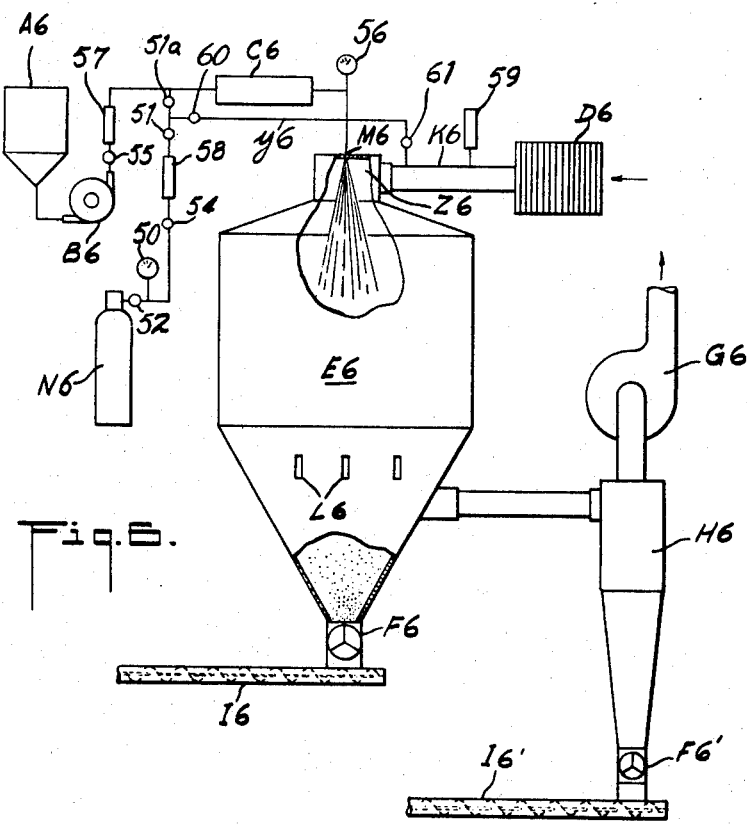
INVENTOR.
MICHELE BONOTTO
BY
*Joseph F. O'Brien*
ATTORNEY United States Patent Office 2,970,914
Patented Feb. 7, 1961

2,970,914

COFFEE BEAN PRODUCTS AND METHODS FOR PRODUCING SUCH PRODUCTS

Michele Bonotto, Princeton, N.J., assignor of one-half to McCormick & Company, Incorporated, Baltimore, Md., a corporation of Maryland, and one-half to said Bonotto, Reginald M. Webster, and Joseph Gola, Jr., New York, N.Y.

Filed Sept. 24, 1957, Ser. No. 685,782

8 Claims. (Cl. 99—71)

This invention relates to improvements in coffee bean products and methods for producing such products. In particular, this invention relates to an improved concentrated coffee extract and a novel process for producing such extract.

It has heretofore been known to produce commercial products generally known as "instant coffee." Characteristically, such products are produced as a solid concentrated powder or a granulated material comprising the water-soluble solids obtained by an aqueous extract. With slight variations, the general procedure for producing these "instant coffee" products has been to: (a) roast or toast a raw commercial coffee bean in the known manner to develop the characteristic aromas, flavors, and color of the desired coffee product; (b) remove the water-soluble solids from the roasted bean or meal by an aqueous extraction; and (c) concentrate the extract by one means or another. The typically solid concentrate resulting from such process is used by the consumer to prepare a coffee beverage, generally by the addition of hot water to an appropriate quantity of the extract.

It will be appreciated that the objective in preparing an instant coffee extract is to dispense with the usual operations for "making coffee," that is preparing the beverage directly by extracting the ground roasted coffee bean with the appropriate quantity of hot water according to the strength of the beverage which is desired. The familiar "instant coffee" procedure is obviously simpler and avoids the necessity of disposing of coffee grounds which is an objectionable operation for many consumers.

In the above-described preparation of "instant coffee," the extraction of the water-soluble solids from the roasted coffee beans is carried out somewhat in the following fashion: (a) a more or less concentrated aqueous solution of the solubles contained in the roasted coffee bean is prepared by a method such as percolation, the operation taking place at varying temperatures; (b) this aqueous solution is then initially concentrated by evaporation or freezing, care being taken at this point to retain the characteristic flavors and aromas in the concentrated solution, the concentration of which can vary according to the market demand; and (c) the extract is finally dehydrated if it is desired in a solid dry state.

There is little difficulty in obtaining a coffee extract in liquid or dry form which will be soluble in hot water and which will also contain the coloring matter and general constituents present in coffee brewed directly from ground coffee beans. The problem and real difficulties arise in preserving the flavors and aromas characteristic of a home-brewed coffee beverage in above-described coffee extracts. Obviously, if such flavors and aromas are not present in the extract itself, they will not be present in the beverage prepared by the addition of hot water thereto.

It is well known that the coffee bean in its raw state does not possess any of the flavors, aromas, or the color of the roasted or toasted coffee bean sold to the consumer. It is only in the roasting operation that these flavors, aromas, and color are developed. During that treatment at an elevated temperature, there apparently takes place a series of complex chemical reactions, such as oxidation, reduction, polymerization, and general pyrolytic decomposition, and, in part, perhaps, destruction distillation. As a result of this roasting operation, the chemical structure and constituents of the coffee bean have been modified to an extent that the substance providing the desired flavors, aromas, and color are now present. These substances are, however, highly volatile and are highly sensitive to heat and concentration procedures. Exacting and closely controlled processing conditions are accordingly required in coffee roasting operations. Since beans obtained from different areas and different trees may vary considerably in their behavior under the roasting conditions, the operation requires the supervision of the skilled coffee roaster who exercises his subjective judgment, gained by experience, to determine when the optimum roasting has been achieved for a particular lot of beans.

Obviously, the above-described delicate character of the flavor- and aroma-providing constituents suggests that, when the aqueous extract from the roasted coffee bean is subjected to the concentration and dehydration procedures, a high proportion of these constituents will be lost. In particular, high temperatures must be avoided during the concentration operations and this necessitates the utilization of the expensive high vacuum concentration equipment. In some cases, it has been found necessary to operate in the presence of inert gases.

To avoid the problems associated with high temperature-vacuum techniques, freezing techniques have been adopted to separate the water in solid form from the desired brew. This, however, requires expensive and complicated refrigeration equipment.

Other attempts have been made in the prior art to avoid the disadvantageous loss of the flavors and aromas. For instance, soluble carbohydrates have been added to the extract for the purpose of "sealing in" the desired constituents. Such added substances will necessarily be found in the final beverage, however, and may constitute an objectionable addition for certain markets and certain uses. In other cases, the roasted coffee beans have been subjected to a first extraction to remove the flavor- and aroma-containing constituents. This primary extract is then added to the final product in the last stages of the process, the attempt being made in this technique to conduct the concentration steps on an extract containing only the remaining soluble which provide body to the coffee.

In view of the above-indicated difficulties which lead to losses of the volatile constituents during the concentration process, attempts have also been made to extract ground coffee beans. In this technique, only the extract, after concentration, is heated or roasted to develop the flavors, aromas, or color. While theoretically such a technique would avoid the loss of the above-noted desirable constituents, the peculiar characteristics of the green coffee bean extract have presented a practical utilization of the technique. This latter extract becomes thick and sticky in the roasting temperature and even methods such as high frequency di-electric heating and infrared radiation have failed to provide the uniform heating which is required in the roasting operation to form a product having the desired charactertistics. Since stirring is well-nigh impossible, the usual heating techniques also result in burned and charred portions mixed in with substantially unroasted portions in the entire mix.

This invention relates to a novel and improved process for producing an improved soluble coffee preparation which substantially avoids the above-noted disadvantages.

More particularly, it is an object of this invention to provide a process for preparing a soluble coffee preparation from raw or green pre-conditioned but unroasted coffee beans by forming a water-soluble extract thereof and thereafter roasting such extract.

A further object of this invention is to provide a novel process for pre-conditioning raw or green unroasted coffee beans below the roasting temperature thereof, extracting the water-soluble materials from such pre-conditioned beans, concentrating and roasting such extracts.

Another object of this invention is to keep the above-noted extract in fluid form at the roasting temperature so as to permit adequate control of the heat transfer in the mix.

Another object of this invention is to carry out the roasting of the extract under a positive pressure to prevent the escape of original water in the liquid extract.

A further object of this invention is to provide a process for producing a roasted coffee extract which comprises pre-conditioning raw coffee beans at a pre-conditioning temperature, below a roasting temperature, extracting the pre-conditioned coffee beans with water, concentrating the extract, and thereafter subjecting the same to a roasting temperature to produce the characteristic flavor- and aroma-yielding constituents of roasted coffee in the extract.

Still another object of this invention is to provide a process wherein the roasting is carried out in the presence of oxygen.

More particularly, it is an object of this invention to provide a process for the production of an aqueous liquid roasted coffee extract, wherein the extraction is carried out with pre-conditioned coffee beans which have been pre-conditioned by heating at a temperature below the roasting temperature for a period of time sufficient to coagulate and insolubilize the water-soluble proteins, albuminoids, gums, resins, etc.

The presence of protein, in particular, in the final product will lead to the deposition of an insoluble residue in the ultimate beverage. This is obviously undesirable in many markets. Therefore, this invention includes the step of rendering these protein materials insoluble in water by subjecting the oil-free solids to coagulation and insolubilization temperatures higher than those necessary to "pre-condition" the beans and for a longer time period. Operation in this manner will also insolubilize more effectively objectionable acrid vegetable substances present in the raw beans.

Thus, the coagulation and insolubilization steps act to effectively eliminate water-insoluble materials from the extract prior to its subsequent treatment with water to form a beverage. In addition, the process of this invention will generally eliminate the heat-insolubilizable vegetable matter which otherwise would be carried through with the water-soluble solids which is desired to retain; and in this application the term "heat-insolubilizable vegetable matter" is used in reference to the aforementioned proteins, albuminoids, gums, resins, etc., and acrid vegetable matter.

Surprisingly, my novel pre-conditioning step permits the roasting operation to be carried out on the concentrated liquid extracts without the disadvantages leading to inoperativeness which are observed, as mentioned heretofore, with an extract prepared from raw unconditioned beans. In addition, it will be clear that roasting at this later stage in the process leads to the retention of the desired components in the marketed product.

Other objects will become apparent from the following detailed description of the invention.

The accompanying drawings severally illustrate flow sheets and suitable apparatus to be employed in the practice of this invention:

Figure 4 is a longitudinal section illustrating another form of apparatus by which my process can be carried out continuously and which may be kept in full condition;

Figure 5 is a transverse cross section on the line 5—5 of the apparatus illustrated in Figure 4; and Figure 6 is a diagrammatic view or flow sheet of a further embodiment of my invention, which is also continuous and in which the resulting product is obtained in a dry form by simultaneous spray-drying and roasting.

Figure 1:
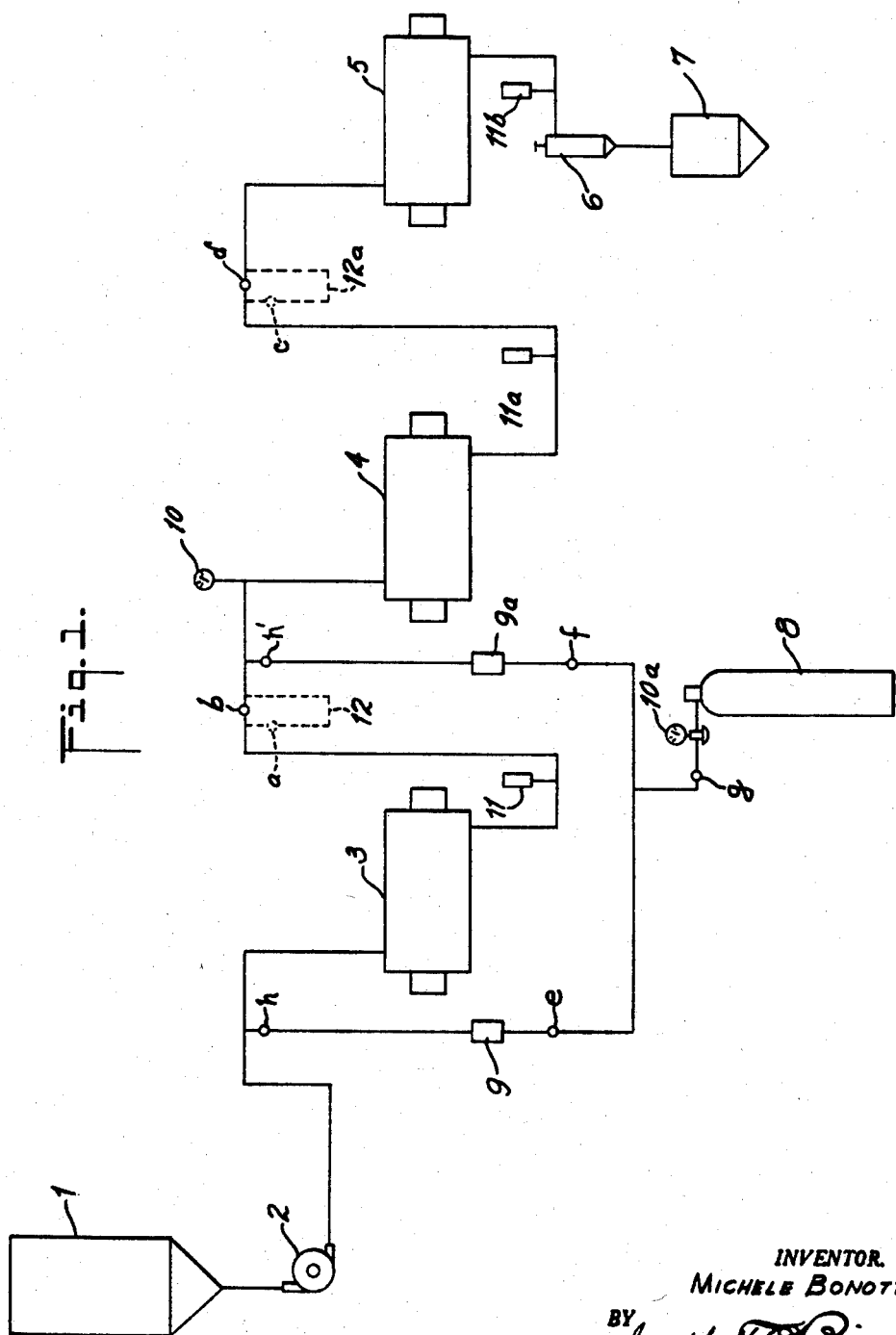
Figure 1 is a diagrammatic view or flow sheet of the process employed in carrying out the present invention.

The pre-conditioning step of the present invention comprises the heat treatment at an elevated temperature below a roasting temperature. As described above, the actual conditions for roasting a coffee bean in the conventional manner vary with the characteristics of the particular beans being treated. The roasting conditions, such as time and temperature, differ according to the source of the beans and the desired results as to color, taste, aroma, and degree of roasting to suit the taste of the consumer.

The same considerations apply to the instant pre-conditioning procedure of this invention. The objective of the step is to coagulate and insolubilize the vegetable matter which, as noted above, it is desired to exclude from the later formed aqueous extract. In addition, this step develops and eliminates the acrid and other undesirable substances.

The temperatures to be employed in the pre-conditioning step will be as high as possible without developing the characteristic taste and aroma of roasted coffee. For this purpose, a batch of, for example, 500 pounds of raw or green beans is introduced into a conventional roaster. Moderate heat is applied until the moisture is driven out of the beans and the temperature of the mass will have reached approximately 200° to 212° F. At this point, the heat is gradually increased so that the temperature of the mass will be raised to about 300° to 310° F., this operation requiring about 12 to 14 minutes. Typically, the mass will then be kept at the temperature for approximately 4 to 6 minutes. Additional heat is then slowly applied until a point is reached where the odor of roasted coffee can be first detected. A slight swelling of the beans will also be noted at this point. This final step will take about 3 to 5 minutes and the above indications marked the end-point of the pre-conditioning treatment. The material is then rapidly discharged from the roaster and rapidly cooled by ventilation or quenching.

It is, of course, possible to operate the pre-conditioning treatment by gradually increasing the supply of heat incrementally over the total length of the time specified above provided that the heat supply can be closely regulated so that the below roasting temperature is not exceeded. It will also be apparent that stirring or other agitation of the mass of beans in the roaster is desirable in order to achieve uniform heating.

It is emphasized that the above specific conditions may vary considerably with different varieties and quantities of coffee beans as discussed heretofore. Consequently, these features are to be considered as an example rather than as a fixed or critical figure. The important features of this process reside in the relatively slow increase in temperature of the beans and maintaining the temperature below a roasting temperature. The skilled and experienced coffee roaster will fully comprehend and be able to detect the above-noted end-point for this step. Generally, the minimum pre-conditioning temperature will be above 185° F.

On the completion of the pre-conditioning treatment and the above-noted cooling step, the pre-conditioned beans are then ground or comminuted or flaked as best suited to the subsequent method of aqueous extraction. The grinding, comminuting, or flaking steps can be carried out in conventional manners. It is contemplated as an additional embodiment of this invention to increase the percentage of coffee solids in the finished roasted extract by a hydrolyzation operation at this point. In this technique, hemi-cellulose and other compounds existing in the green coffee beans but insoluble in hot water may be solubilized. Among other techniques, this can be done by subjecting the comminuted pre-conditioned beans to elevated temperatures and pressures during the subsequent aqueous extraction.

It will be appreciated that the extraction of the pre-conditioned beans can be carried out in generally conventional fashion and the extraction may be filtered if necessary. It will also be recognized that this extract may be produced in the coffee-growing countries and shipped in the highly concentrated form to the consumer market areas prior to the subsequent roasting step. This procedure will realize important advantages in handling and shipping costs over the conventional shipping of the green beans to the market areas prior to any extraction or concentration step.

It is conceivable that the various heat treatments described above may possibly destroy the organic oxidative catalysts existing in the green beans principally in the form of chlorophyll complexes. If desired, these catalysts may be added in proper proportion to the extract prior to the roasting operation.

The roasting of the coffee extract is carried out generally at a temperature about 350° F. and under a positive pressure generally corresponding to said roasting temperature. Again, the actual temperatures employed will depend upon the particular characteristics stemming from the nature of the original coffee bean. This roasting step may be conducted in apparatus as will be hereinafter further described and preferably the extract will be well stirred throughout.

The roasting step may be carried out under a pressure induced, at least in part, by an inert gas such as for instance carbon dioxide or nitrogen. Heat will be generally supplied to the surfaces of the pressure kettle. A preliminary concentration of the extract may be carried out in the same kettle prior to raising the temperatures to the roasting level.

In a further embodiment of this invention, the roasting operation is carried out in the presence of an oxygen-containing gas, such as air, oxygen, or ozone, or mixtures thereof. Other oxidants which liberate oxygen under the roasting conditions may also be used, as, for instance, a weak solution of hydrogen peroxide. Preferably, the oxidizing agent will be one of the above-mentioned since no objectionable chemical by-products are left in the finished coffee extract as a result of the oxygen reaction. When this oxygen embodiment of the roasting step is employed, it is possible to use significantly lower temperatures. In fact, temperatures as low as room temperature may be employed. I am not certain whether the oxidant operates as an oxidizing agent per se or in a catalytic manner to lower the temperature required to induce the chemical reactions taking place during roasting. Generally speaking, above a temperature of 212° F., a positive pressure is still desirable when the oxidizing agent is present, but at lower temperatures the pressure may be no more than atmospheric. Typical temperatures which may be used in this step range from 280° to 380° F. Again, however, temperatures outside this range are contemplated when the subjective taste requirements of the consumer markets so dictate.

It should be appreciated, however, that in either the high temperature-inert gas or the lower temperature-oxidizing agent embodiment, the actual temperature is clearly a roasting temperature as that term is understood by those skilled in the art.

Desirably, the extract is somewhat concentrated prior to the roasting procedure and I prefer to operate so that the concentrated extract has a viscosity comparable to corn syrup or honey and molasses at room temperature. The solids content of such concentrate may be between 45 and 75% and higher as up to 90%. Preferably, the solids concentration will be about 80%.

In order that my invention may be clearly understood, reference is made at this point to the drawings herewith.

Referring now to Figure 1 of the drawings which represents a diagrammatic flow sheet: The storage tank 1 is provided in which the fluid extract may be preheated, if desired; 2 is a proportioning pump; and 3, 4, and 5 indicate heat exchangers which may be of the type illustrated in greater detail in Figure 3. A conventional extrusion valve 6 is so constructed as to discharge the extract from the system and at the same time maintain in it the desired pressure. Tank 7 receives the finished roasted extract. At 8 is represented a container wherein the oxidant in gaseous form is stored under pressure. Devices 9 and 9a are used to measure the amount of gas entering the system, and pressure gauge 10 will indicate the pressure therein. The oxidant supply line is fitted with a pressure reducer and indicator 10a and thermometers 11, 11a, and 11b are supplied to facilitate proper control of the temperature. At 12 and 12a loops and pipes of suitable diameter and with suitable by-passes may be provided in order to hold the extract for a desired length of time. As indicated by the dotted lines, these elements in the apparatus are optional. Valves are represented by a, b, c, d, e, f, and g and function as will be described hereinafter. Check valves h and h' prevent the back-flow of extract to the measuring devices 9 and 9a. Tank 8, pressure reducer and indicator 10a, and valve g with the accompanying line may be eliminated from the system or may be utilized to provide a source of and supply control for the admission of an inert gas if the above-described oxidation technique is not employed.

It will be understood that this flow sheet describes the method of roasting the concentrated extract of the pre-conditioned beans. The novel step of pre-conditioning will be carried out in conventional roasting apparatus as disclosed above and this step and the concentration step are not specifically illustrated.

The concentrated raw coffee extract which is delivered to storage tank 1 may be preheated if desired in order to adjust the viscosity to suit the working characteristics of pump 2. The quantity of extract delivered to the rest of the system may be regulated by the necessary adjustment of pump 2.

If, for example, the desired degree of roasting of the final product takes place at a temperature of about 320° F. for a total holding time of one minute, and assuming that the desired taste characteristics are obtained by reaching this roasting temperature in two steps, the temperature of heat exchanger 3 will be regulated so that thermometer 11 on the line leaving the heat exchanger will be maintained between a reading of 280° F. and 310° F. The length of loop 12 may, in this case, be adjusted so that the extract will require 30 seconds to flow from heat exchanger 3 to heat exchanger 4. Proper manipulation of valves a and b will shorten or lengthen this travel-time. The extract then entering heat exchanger 4 will be brought to the temperature of 380° F. therein. Thermometer 11a will indicate the temperature of the liquid leaving the heat exchanger.

Suitable adjustment of valves c and d will determine the travel-time for the extract between heat exchangers 4 and 5 which may again be adjusted to about 30 seconds. This technique will keep the material in the system for a total time of one minute comprising 30 seconds at a temperature of 310° F. and 30 seconds at 380° F. before reaching heat exchanger 5.

In heat exchanger 5, the roasting extract is cooled under the pressure existing in the system to the desired temperature, as indicated on thermometer 11b. The roasted extract is then discharged through extraction valve c into the receiving tank 7 at atmospheric pressure. In the operation described above, the pressure in the whole system, as indicated on pressure gauge, will be between 180 and 200 p.s.i.g.

It will also be understood that preliminary to starting the operation, the system may be brought to the desired temperatures by suitable circulation of heat exchange liquids and/or by circulating heated water and other suitable fluids through the system to further aid in heating the apparatus.

The adjustment of pressure reducer 10a and valve g will introduce the inert gas in sufficient quantity to obtain the desired pressure. If an oxidizing agent, such as air or oxygen, is present in tank 8, the appropriate amount to be introduced to the system is similarly controlled. If it is desired to use ozone as the oxidizing agent, a suitable conventional oxonizer (not illustrated) may be placed in the line between pressure reducer 10a and valve g. It is also contemplated that the oxidizing agent may be introduced at more than one point in the system as for instance into heat exchanger 3 as well as heat exchanger 4. In this embodiment, the oxygen will react at two different temperatures, in the above example at 310° F. and 380° F. for 30 seconds in each instance. This may be accomplished by suitable adjustment of pressure reducer 10a to a pressure greater than that existing in the system and by the appropriate regulation of valves e and f. The amount of oxidant admitted into the respective portions of the system will be measured by devices 9 and 9a. In operating according to this scheme, and employing compressed air at a pressure of from 100 to 250 p.s.i., the amount that I inject into the system is of the order of approximately between 0.3 to 1.5 to 1, ratio by volume.

As is seen from the above description, a number of variables are possible in the indicated process flow sheet. This versatility in process operation permits the production of the final product of the taste characteristics as desired and in accordance with the characteristics of the different varieties of coffee beans which may be used as starting materials. For instance, the total roasting time may be as short as 10 seconds and the temperature can be as high as 410° F. The specific figures indicated in the description above are set forth only to exemplify one of the innumerable set of conditions under which the process can be performed.

It will be further appreciated that one of the characteristics of the above-described system is that all of the apparatus and piping, operating under pressure, are kept in full condition; that is, the concentrated fluid extract from the delivery end of the pump 2 to the delivery end of the extrusion valve 5 will occupy all of the available internal space.

Figure 2:
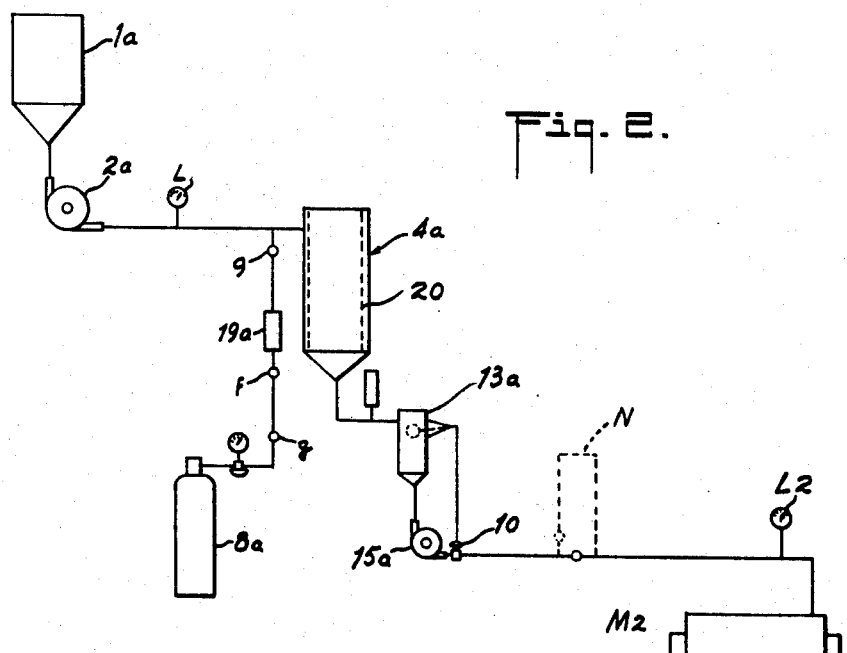
Figure 2 illustrates a flow sheet of a variation of this process.

In Figure 2, I have illustrated another method by which the process may be carried out. In this embodiment, the step of preheating to 320° F. is omitted. Accordingly, the process is carried out by raising the temperature of the extract to the roasting temperature, for example 380° F., very rapidly and in one step. In this embodiment, the concentrated pre-conditioned coffee bean extract from storage tank 1a passes through pump 2a to the roaster 4a under a pressure as shown on gauge L, and other conditions similar to those described above in respect to Figure 1. The fluid extract, flowing downwardly along the heated surfaces of the roaster 4a by gravity, is distributed through float level control system 13a, which regulates in turn the flow of the roasted extract to the cooling heat exchanger 5a and collecting tank 7a, by throttling the delivery end of the centrifugal pump 15a, the latter maintaining the proper pressure in the cooler. The holding time at the roasting temperature may be regulated according to the description of this step in relation to Figure 1 and loop N may be adjusted as desired to achieve this period of time.

Tank 8a may again be employed for the admission of either the oxidizing gas or the inert gas, each of which will enter the system through valve 9 and measuring device 19a operated by valves f and g.

L2 is a pressure gauge; M2 is a thermometer to facilitate proper control of temperature and 6a is a conventional extrusion valve to discharge the extract from the system and at the same time maintain in it the desired pressure.

Roasting apparatus 4a contains a heated inner surface of the cylinder 20 over which the fluid extract travels. This feature is illustrated in greater detail in Figure 3.

Figure 3:
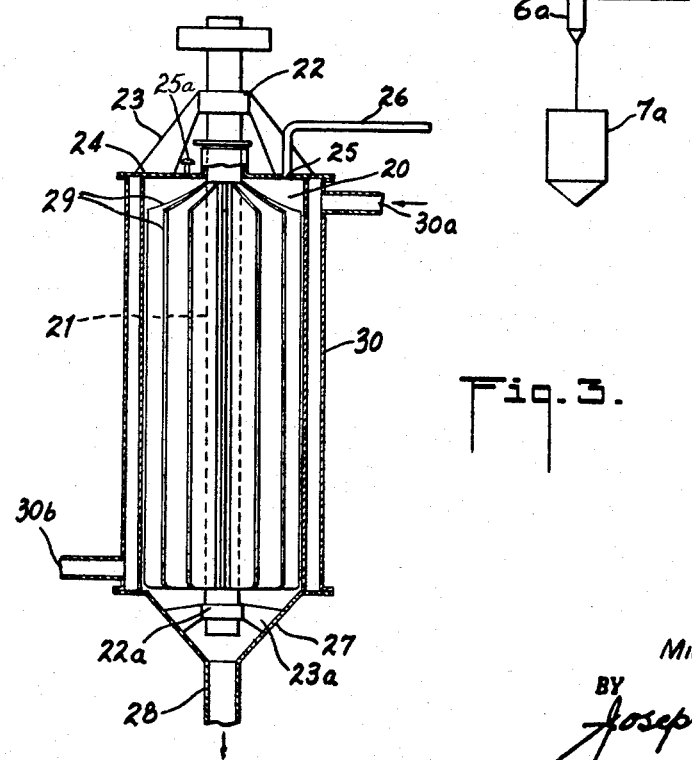
Figure 3 is a sectional view of a heat exchanger which may be employed when continuously operating my process wherein the fluid extract travels toward the outlet by gravity in the form of a falling film over the heated surfaces of the roaster.

Referring now to Figure 3, this illustrates a sectional view of roasting apparatus 4a. The vertically disposed tubular container 20 is provided with an axial shaft 21 mounted in shaft bearings 22, 22a, suitably supported in bearings 23, 23a. The upper end is provided with a horizontally disposed head plate 24 provided with an inlet 25 connected to a pipe 26 through which the coffee extract enters the container 20. Release valve 25a controls the pressure in the apparatus and to permit discharge of excess gas developed during operation. The lower end of the container is provided with a conical bottom 27 axially connected to exit pipe 28. A rotor comprising a series of rotor blades 29 is mounted on shaft 21 beneath inlet 25 and in operation will rotate at a sufficiently high speed to provide the necessary centrifugal force to throw the extract against the heated walls of the container. These blades extend the full length of tubular container 20 and have the peripheral edges disposed as close as possible to the internal surface of said container and function so as to provide a distributing surface for the coffee extract. Heat is supplied to container 20 by providing a heating jacket 30 spaced from the container and adapted to receive through inlet 30a a suitable heat exchange medium which exits through outlet 30b. During travel through this apparatus, the extract will assume the form of a falling film travelling downwardly over the internal surface of container 20. Consequently, a portion of the internal space within this apparatus will be occupied only by steam and gases developed during the roasting operation and at the pressure corresponding to the roasting temperature.

In Figures 4 and 5, I have shown an apparatus in which a roasting or caramelization operation may be carried out as a continuous commercial operation. This form of apparatus consists of a cylinder 34 provided with a jacket 34a and having a co-axial shaft 35 extending therethrough and mounted in bearings 35a and 35b. The shaft 35 has an internal portion 36 of increased diameter within the cylinder 34 and said internal portion 36 is provided with scrapers 37 suitably secured thereto as by suitable bolts 38. The cylinder is provided with suitable means, such as the pipe 34b, for supplying heat to the jacket 34a and, as shown, I provide pipe 34b connected to said jacket; also a suitable inlet pipe A5 for the extract to be treated is provided with a valve 45 and leads to a suitable supply of the material which passes into the annular space 46 between the jacketed cylinder 34 and internal shaft portion 36 with its scrapers 37 when the material is continuously forced through the inlet A5 and leaves through the outlet pipe B5 which is provided with valve 47.

In accordance with the apparatus of Figures 4 and 5, the pre-conditioned and concentrated fluid coffee extract in condition to be roasted is continually introduced or pumped under pressure by a suitable pump (not shown) into the annular space through the inlet pipe A5 and discharged through the outlet pipe B5. The desired pressure (100–250 p.s.i., or more) is maintained in the annular space by the action of the feeding pump and the duration of the operation is regulated by the outlet valve C5 when the g.p.m. delivery of the pump and the pressure in the annular space is kept constant. This procedure has never been applied, so far as I am aware, to the roasting or caramelizing operation of a coffee extract under pressure. The finished product delivered through the valve C5 is then cooled under pressure to about 70–80° F. through a conventional heat exchanger if the concentration of the desired final prouct will not produce a fluid with such a viscosity that cannot be handled by the conventional heat exchanger.

A unit of design identical to the roasting operation may be used to cool the final roasted product of the desired high viscosity under pressure. This unit will be connected in series with the previous system and the only difference in operation is that the cooling medium such as water is circulated in the heat transfer jacket. The cooled product can then be discharged at atmospheric pressure through valve C5 of the cooling units.

If it is desired to obtain the product in solid form, roasted extract may be discharged under pressure into a suitable cooling container or containers. Such a cooling container is maintained under a suitable positive pressure by means as, for example, the introduction of an inert gas.

It is to be understood, however, that in the extract roasting operation, operating under the positive pressure at temperatures above 212° F. (either in the presence of an inert gas or an oxidizing agent), will prevent the dehydration of the extract. This feature enables me to maintain the aqueous extract in liquid form throughout this operation.

In Figure 6, I have illustrated a spray-drying embodiment of the invention. The pre-conditioned coffee bean extract is preheated, if necessary, to reduce its viscosity and is then stored in a supply tank A6. Pump B6, preferably a gear-pump with recirculation means, delivers the material past valve 55 to the system at a rate measured by flow meter 57. The extract then passes through heat exchanger C6 where it is heated to a temperature close to its boiling point. The extract is then sprayed out the spray nozzle M6 in the form of a mist at the top of drying chamber E6. It enters the swirling current of air which enters the chamber tangentially at point Z6. The air, which may be filtered if desired, is drawn into the drying chamber E6 by suction fan G6 and preheated through heat exchanger or air heater D6, element 59 being a thermometer. It is then evacuated with the evaporated water from the system by the same suction fan G6. Under the above circumstances, the heat content of the air evaporates the water from the semi-divided droplets of the extract and raises the temperature of the roasting dried solid particles to the desired roasting point. Said solid particles drop by gravity through drying chamber E6. During this downward travel, cool air entering chamber E6 through adjustable slots L6 cools the particles which are then collected at the bottom conical portion of the chamber E6. The finer particles which may be entrained by the current of air exiting from the system through fan G6 may be collected at the bottom of the cyclone casing H6.

The dried and cooled roasted coffee extract is then discharged from chamber E6 and cyclone casing H6 by the screw-conveyors I6 and I6' through the rotary valves F6 and F6' which also act as air cells.

Figure 6 and the above description are intended to be schematic illustrations of the fundamentals of the spray-drying art. Numerous spray-drying systems based on the same principle but with various modifications are presently in commercial operations to produce food preparations in powdered form such as milk, fruit juices, coffee, malt, etc. Generally, certain characteristics such as color, flavor, aroma, solubility, etc., must be preserved by eliminating the water at the lowest possible temperature as for instance between 130° F. and 180° F. In spray-drying of coffee extracts some processes use inert hot combustion gases instead of hot air, while others use a mixture of these two. These various systems can be adapted to my new process of drying and roasting in one step but it is to be clearly understood that instead of employing the lowest possible temperatures in the process, I operate at a temperature of approximately 340 to 420° F. in the drying zone at the upper portion of drying chamber E6.

In a preferred form of this embodiment of the invention, the concentrated pre-conditioned coffee bean extract having a dry solids content between, for instance, 60 to 75%, is supplied to tank A6 at a temperature of about 200° F. Gear pump B6 is then put into operation to deliver a measured quantity of material to nozzle M6 through heat exchanger C6 where the temperature is raised to about 212° F. A pressure of about 70 to 150 p.s.i.g. is maintained at pressure gauge 56 by regulation of the recirculating device (not shown) on pump B6. The pressure at gauge 56 will depend in part upon the viscosity of the extract, the characteristics of nozzle M6 and the desired degree of particle size in the mist formed thereby. If centrifugal spraying is used instead of nozzle-spraying, the pressure indicated by gauge 56 need only be sufficient to deliver the extract to the rotor of the centrifugal spraying device. In such a case, the pump B6 may be a centrifugal pump instead of a gear pump.

The desired quantity of air, depending on the amount of material to be dried and its concentration, will be drawn into chamber E6 by fan G6 through inlet Z6 after being heated in exchanger D6. The entering temperature of the air will be determined by the regulation of exchanger D6 and the rate of flow so as to supply sufficient heat to evaporate the water present in the extract to maintain the roasting temperature of 340° to 420° F. or higher in the upper section of chamber E6. As an example, for spray-drier processing at a rate of 35 cc. per minute of an extract, the amount of air entering at Z6 is about 2500 cc. per minute, its temperature is about 580° F. and the air temperature in the drying chamber E6 is about 370° F. Under these conditions, a medium-roasted coffee extract is obtained.

In roasting a coffee extract of 65 to 75% solids, I prefer to maintain an air temperature in the drying zone of chamber E6 at about 340 to 385° F. This manner of operation will yield a final product which is neither too powdery nor too coarse, as compared to the "instant coffee" now on the market and which has been roasted to a desired degree. In addition, these conditions have the advantage of reducing the amount of air required to cool the solid particles falling out of the drying-roasting zone.

If a higher roasting temperature is employed for instance up to about 420° F., the solid particles may coalesce in the air-stream which yields solid globular particles. The coarseness thereof may be controlled by varying the percentage of solids in the fluid extract entering the drier and also by varying the direction of the cooling air entering through slots L6. For some markets, this new product of more or less closely granulated form may have special appeal due to its relatively high specific weight, particularly when such particles are properly and uniformly graded. The specific weight may be for instance from 0.6 gram to 0.8 gram per cubic centimeter.

It will be appreciated that when air is used in the above technique as the gaseous heating medium, the operation will inherently take place according to my above-described oxidizing embodiment of the invention. However, if the advantages resulting therefrom are desired, it is preferred to employ hot combustion gases instead of air as the heat source, and the necessary oxygen is independently supplied to the system. For instance, the oxidizing agent may be supplied from pressure tank N6 to any point in the line between pump B6 and nozzle M6. The quantity will be measured by flow meter 58 and adjusted by operation of valves 52 and 54 on either side of pressure gauge 50. The embodiment illustrated in the figure provides for introducing the oxidizing agent into the extract line between heat exchanger C6 and extract flow meter 57. Alternatively, the oxidizing agent can be admitted through line Y6 controlled by valves 60 and 61 into combustion gas line K6. It is also possible by suitable manipulation of valves 51, 51a, and 60 to have the oxidizing agent enter at both of the above named points.

The action of the oxygen present in the drying atmosphere is enhanced by the pulverized form of the solids floating in the solids of the gas during the roasting operation. It will be appreciated that the surface area of these particles is very great as compared to that of an extract treated in the form of a film.

A further operating alternative will effect an economy in the quantity of heat required to evaporate the water. In this embodiment, the liquid extract is superheated in heat exchanger C6 to a degree that the water will be removed therefrom by a flash evaporation in leaving nozzle M6. Therefore, the air entering at point Z6 need only supply the corresponding heat of evaporation and that heat required to raise the temperature of the dehydrated solid particles to the roasting and/or melting temperature.

The following example illustrates my process when operating in the presence of an inert gas and maintaining the coffee extract in fluid form during the roasting operation.

A quantity of raw coffee beans were pre-conditioned in a conventional roasting device. The beans were stirred while the temperature was slowly raised until the first delicate flavors and aromas characteristic of roasted coffee were observed. The beans had just begun to darken and swell slightly at this point. The treated coffee beans were then rapidly expelled and cooled from the roaster.

After cooling, the beans were ground to a meal and extracted with water using conventional techniques. Thereafter, the extract was concentrated by removal of water to a point where the solids content was between 60 to 90%. The viscosity and density of the cold concentrate was roughly comparable to that of commercial corn syrup or honey at room temperature. This concentrated extract was then introduced into a pressure kettle provided with a mechanical agitator and jacketed so that the temperature up to 450° F. or higher could be reached in the inside walls of the kettle. The agitator was so fitted that it contained scraping devices which closely conform to the walls of the kettle. By means of an inert gas, the pressure was brought to about 150 to 250 pounds per square inch. The agitator is started and the desired heat applied to the jacket. As the roasting of the extract proceeded, caramelized roasting film formed locally on contact with the heated walls of the kettle and the scraping surfaces of the agitator constantly remove this film and returned to the main body of the extract. Due to the positive pressure, the mass was absorbed by the water liberated from the film as a result of the roasting and the material in the kettle remained fluid. The viscosity of this material is, of course, greatly reduced at this roasting temperature and the removed partially roasted film was constantly replaced by a new film by action of the agitator and scrapers. Continuing the operation in this manner provided a uniformly treated fluid coffee extract roasted to the desired degree. A sampling valve located in the bottom of the kettle indicated when this desired point had been reached.

Manipulation of a release valve also fitted to the kettles permitted alteration in the pressure and also provided means to detect the aromatic odors of roasted coffee escaping in the inert gas.

This last-described technique is not only suitable for process control but is well adapted to the initial determinations required to locate the optimum conditions to be employed with a given quantity of beans of particular characteristics.

Typically, the roasting operation as described will require from 3 to 15 minutes. When the desired degree of roasting has been achieved, the supply of heat is shut off and the product promptly transferred under pressure to a cooling container where it is again cooled under pressure. This will prevent the escape of the aforementioned volatile aroma and flavor components.

The product obtained will be in a thick fluid or semi-solid state and may be stored indefinitely in sealed containers, frequently without any required refrigeration.

The above-described operations and the typical equipment employed therein are well-known in the art of concentrating and handling liquid viscous extracts such as corn syrup, and similar extracts. The difference between such standard operations and my present novel process using the inert gas, is that the former is carried out at atmospheric or reduced pressures to avoid the caramelization, discoloration, and roasting of the product which is, of course, my very objective. This difference derives, in turn, from my aforementioned novel pre-conditioning step which does not roast the beans prior to extraction as was done in the prior art. Only by the combination of the two steps does one achieve the superior product of my invention.

The utilization of my extract is believed to be obvious from the foregoing description. To form a beverage therefrom, it is only necessary to add a quantity of water to a portion of the extract according to the strength of coffee desired by the consumer. The "cup of coffee" thereby obtained closely corresponds to that brewed by such conventional methods as percolation and the like.

It thus will be seen that the objects of this invention have been fully and effectively accomplished. It will be realized, however, that the foregoing specific embodiments have been shown and described only for the purpose of illustrating the principles of this invention and are subject to change without departure from such principles. Therefore, this invention includes all modifications encompassed within the spirit and scope of the following claims.

I claim:

1. A process for producing a fully roasted fluid coffee concentrate from raw coffee beans comprising providing a quantity of raw coffee beans, heating said raw beans to a temperature and for a period of time sufficient to drive out substantially all of the moisture therein, then gradually increasing the supply of heat to a point below the roasting temperature until the odor of roasted coffee is first detected and the beans exhibit a slight swelling whereby the acrid substances formed under such conditions are stripped from the beans and the water soluble vegetable proteins and albuminoids in said beans are made insoluble, thereafter rapidly discharging the beans from the source of heat and rapidly cooling the same, particulating such beans to produce a meal, preparing an aqueous extract of said coffee bean meal, concentrating such extract and subjecting the same in fluid form to a roasting temperature, whereby are developed in said fluid coffee bean concentrate the aromatic principles which produce the characteristic flavors and aromas of roasted coffee inherently present in undeveloped form in said fluid concentrate.

2. The process of claim 1 wherein said extract is concentrated to 45% to 90% solids content.

3. The process of claim 1 wherein said roasting operation is conducted under positive pressure and in the presence of an inert gas.

4. The process of claim 1 wherein said roasting operation is carried out in the presence of an oxidizing agent.

5. The process of claim 4 wherein said oxidizing agent comprises oxygen.

6. The process of claim 4 wherein said oxidizing agent comprises air.

7. A process for producing a fully roasted fluid coffee concentrate from raw coffee beans comprising providing a quantity of raw coffee beans, heating said raw beans to a temperature approximately in the range of from 200° to 212° F. and for a period of time sufficient to drive out substantially all of the moisture therein, then gradually increasing the supply of heat to a point approximately in the range of from 300° to 310° F. over a period of about 12 to 14 minutes, during which acrid substances are formed, maintaining the beans at this temperature for approximately 4 to 6 minutes during which said acrid substances are stripped from the beans, thereafter gradually increasing the supply of heat over a period of time of about 3 to 5 minutes to a point below the roasting temperature until the odor of roasted coffee is first detected and the beans exhibit a slight swelling whereby the water soluble vegetable proteins and albuminoids in said beans are made insoluble, thereafter rapidly discharging the beans from the source of heat and rapidly cooling the same, particulating such beans to produce a meal, preparing an aqueous extract of said coffee bean meal, filtering said extract, concentrating such extract to a solids content of from about 45% to 90%, roasting said fluid concentrate at a temperature above about 350° F., whereby are developed in said fluid coffee bean concentrate the aromatic principles which produce the characteristic flavors and aromas of roasted coffee inherently present in undeveloped form in said fluid concentrate.

8. A process as claimed in claim 7 wherein said roasting is carried out under a positive pressure in the presence of air.

References Cited in the file of this patent
UNITED STATES PATENTS

| | | |
|---|---|---|
| 95,015 | Galloway | Sept. 21, 1869 |
| 843,530 | Gram | Feb. 5, 1907 |
| 1,175,490 | Vietinghoff | Mar. 14, 1916 |
| 1,932,769 | Copes | Oct. 31, 1933 |
| 2,119,329 | Heuser | May 31, 1938 |
| 2,149,876 | Wendt | Mar. 7, 1939 |
| 2,863,774 | Bonotto | Dec. 9, 1958 |
| 2,872,323 | Perech | Feb. 3, 1959 |